(12) United States Patent
Yang et al.

(10) Patent No.: US 7,985,349 B2
(45) Date of Patent: Jul. 26, 2011

(54) NON-CONDUCTIVE COLORED HEAT TRANSFER FLUIDS

(75) Inventors: Bo Yang, Ridgefield, CT (US); Peter M. Woyciesjes, Woodbury, CT (US); Filipe J. Marinho, Danbury, CT (US); Aleksei V. Gershun, Southbury, CT (US)

(73) Assignee: Honeywell International Inc., Morristown, NJ (US)

( * ) Notice: Subject to any disclaimer, the term of this patent is extended or adjusted under 35 U.S.C. 154(b) by 1022 days.

(21) Appl. No.: 11/221,593

(22) Filed: Sep. 8, 2005

(65) Prior Publication Data
US 2006/0051639 A1    Mar. 9, 2006

Related U.S. Application Data

(60) Provisional application No. 60/607,968, filed on Sep. 8, 2004.

(51) Int. Cl.
*C09B 69/10* (2006.01)
*C09K 5/00* (2006.01)
*H01M 8/04* (2006.01)

(52) U.S. Cl. ............................. 252/73; 429/437; 8/647

(58) Field of Classification Search .................... 429/26; 252/76
See application file for complete search history.

(56) References Cited

U.S. PATENT DOCUMENTS

| | | | |
|---|---|---|---|
| 3,216,948 A | 11/1965 | Redding | 252/301.2 |
| 3,507,702 A | 4/1970 | Sanderson | 136/86 |
| 3,960,740 A | 6/1976 | Truett | 252/73 |
| 3,964,930 A | 6/1976 | Reiser | 136/86 R |
| 4,284,729 A | 8/1981 | Cross et al. | 521/158 |
| 4,402,847 A | 9/1983 | Wilson et al. | 252/75 |
| 4,514,427 A | 4/1985 | Mitchell et al. | |
| 4,584,125 A | 4/1986 | Griswold et al. | |
| 4,648,883 A | 3/1987 | Podder | 8/527 |
| 4,863,782 A * | 9/1989 | Wang et al. | 428/204 |
| 5,200,278 A | 4/1993 | Watkins et al. | 429/24 |
| 5,723,060 A | 3/1998 | Bruhnke et al. | 252/73 |
| 5,725,794 A | 3/1998 | Bruhnke et al. | 252/73 |
| 5,776,624 A | 7/1998 | Neutzler | 429/26 |
| 6,486,248 B2 | 11/2002 | Ashley et al. | 524/358 |

(Continued)

FOREIGN PATENT DOCUMENTS

CA         2344856        3/2000

(Continued)

OTHER PUBLICATIONS

International Search Report dated Jan. 22, 2007 for International Application No. PCT/US2005/031834, International Filing Date Sep. 8, 2005.

(Continued)

*Primary Examiner* — Ula C Ruddock
*Assistant Examiner* — Stephen Yanchuk
(74) *Attorney, Agent, or Firm* — Cantor Colburn LLP

(57) ABSTRACT

Disclosed is a colored heat transfer fluid, the heat transfer fluid comprising a nonconductive colorant and having a conductivity of less than 200 μS/cm. Also provided is an assembly comprising an alternative power source and a heat transfer system in thermal communication with the alternative power source, the heat transfer system comprising the disclosed low conductivity colored heat transfer fluid. In addition, a method of making a colored heat transfer fluid is disclosed wherein the disclosed nonconductive colorants are added to a heat transfer fluid having a conductivity of less than 200 μS/cm.

11 Claims, 1 Drawing Sheet

U.S. PATENT DOCUMENTS

| | | | |
|---|---|---|---|
| 6,528,564 B1 * | 3/2003 | Xia | 524/242 |
| 6,605,126 B1 * | 8/2003 | Xia et al. | 8/647 |
| 6,663,993 B2 | 12/2003 | Imaseki et al. | 429/26 |
| 6,673,482 B2 | 1/2004 | Imazeki et al. | 429/26 |
| 6,709,779 B2 | 3/2004 | Uozumi | 429/24 |
| 2001/0050191 A1 | 12/2001 | Ogawa et al. | 180/65.3 |
| 2002/0031693 A1 | 3/2002 | Ishikawa | 429/26 |
| 2002/0063088 A1 | 5/2002 | Hidaka et al. | |
| 2002/0076591 A1 | 6/2002 | Imaseki et al. | |
| 2003/0072981 A1 | 4/2003 | Imaseki et al. | 429/13 |
| 2004/0001984 A1 | 1/2004 | Alva | 429/26 |
| 2004/0028963 A1 | 2/2004 | Kormann et al. | |
| 2004/0028971 A1 | 2/2004 | Wenderoth et al. | |
| 2004/0086757 A1 * | 5/2004 | Mohapatra | 429/26 |
| 2004/0110050 A1 | 6/2004 | Elhamid et al. | |
| 2004/0129920 A1 | 7/2004 | Wenderoth et al. | 252/71 |
| 2004/0245493 A1 * | 12/2004 | Abe et al. | 252/71 |

FOREIGN PATENT DOCUMENTS

| | | |
|---|---|---|
| CA | 2430443 | 7/2002 |
| CA | 2435593 | 8/2002 |
| CA | 2445792 A1 | 11/2002 |
| CA | 2449208 A1 | 12/2002 |
| EP | 0 376 126 | 7/1990 |
| EP | 1262535 A1 | 12/2002 |
| EP | 1304367 A1 | 4/2003 |
| EP | 1323677 | 7/2003 |
| EP | 1457542 | 3/2004 |
| EP | 1 416 563 A1 | 5/2004 |
| EP | 1416563 A1 | 5/2004 |
| HU | 209546 | 7/1994 |
| JP | 8185877 | 7/1996 |
| WO | WO 00/17951 | 3/2000 |
| WO | WO0175999 | 10/2001 |
| WO | 02055759 A2 | 7/2002 |
| WO | WO 02/055630 A1 | 7/2002 |
| WO | WO 02/090462 A1 | 11/2002 |
| WO | WO 02/101848 A2 | 12/2002 |
| WO | WO 02/101848 A3 | 12/2002 |
| WO | WO 03/033616 A1 | 4/2003 |
| WO | WO 03/061044 A2 | 7/2003 |
| WO | WO 03/061044 A3 | 7/2003 |
| WO | WO 03/070854 A1 | 8/2003 |
| WO | 2004/053015 A1 | 6/2004 |
| WO | 2004053015 | 6/2004 |

OTHER PUBLICATIONS

Written Opinion Of The International Searching Authority dated Jan. 22, 2007 for International Application No. PCT/US2005/031834, International Filing Date Sep. 8, 2005.

"Amberlyst Weak Base Anions", Internet Article, URL: http://web.archive.org/web/20040623050423/http://www.rohmhaas.com/ionexchange/IP/wba.htm, Jun. 23, 2004.

"Physical Sciences Information Gateway—Chemical Data Tablesy", Internet Article, URL: http://web.archive.org/web/20040305150910/http://www.psigate.ac.uk/newsite/reference/chemdata/12.html, Mar. 5, 2004.

Dr. F.T. Lange, Dr. C. Schmidt and Dr. H. J. Brauch, Emerging Contaminants for Drinking Water Supplies, Perfluoroalkylcarboxylates and -sulfonates, Jun. 2006, www.riwa.org/e)_publikaties/137_ptfe_report.PDF, 29 pgs.

International Search Report for PCT/US2005/032174 dated Jul. 17, 2006, 3 pgs.

Written Opinion for PCT/US2005/032174 dated Jul. 17, 2006, 16 pgs.

Written Opinion for PCT/US2005/032173 dated Dec. 28, 2005, 5 pgs.

Written Opinion for PCT/US2005/031778 dated Dec. 29, 2005, 9 pgs.

Educ. Reso for Part. Techn. 032Q-Nelson, Dispersing Powders in Liquids, Part 3, Copyright 2003 Ralph Nelson, Licensed to ERPT, pp. 4: 1-12.

International Search Report dated Dec. 28, 2005, for PCT/US2005/032173, International Filing Date Sep. 8, 2005.

International Search Report dated Dec. 29, 2005 for PCT/US2005/031778, International Filing Date Sep. 8, 2005.

* cited by examiner

NON-CONDUCTIVE COLORED HEAT TRANSFER FLUIDS

This application claims the benefit of U.S. Provisional Application Ser. No. 60/607,968, filed on Sep. 8, 2004.

FIELD OF THE INVENTION

The invention relates to heat transfer heat transfer fluids, especially colored heat transfer fluids for use in fuel cell assemblies and more particularly to colored heat transfer fluids having very low conductivity for use in fuel cell assemblies.

BACKGROUND OF THE INVENTION

Heat transfer systems in thermal communication with a power source have been utilized to regulate heat generated during the operation of the power source. For example, automotive vehicles have employed heat transfer fluids and cooling systems that transfer and dissipate heat generated as a by-product of gasoline powered internal combustion engines. In this case, the heat transfer fluids and cooling systems ensure that the engine operates in an optimum environment and is not subject to undesirably high temperatures.

However, alternatives to traditional gasoline powered internal combustion engine are now desired, especially alternatives that address public concerns regarding the environmental and the management of natural resources. As a result, new power source technologies continue to be developed, especially those that provide improvements in energy efficiency. Examples of alternative power sources that have been developed include, but are not limited to, batteries, fuel cells, solar photovoltaic cell, and internal combustion engines powered by the condensation of steam, natural gas, diesel, hydrogen, and/or the like. Such alternative power sources may be used alone or in combinations thereof, such as those employed in hybrid vehicles.

Although such alternative power sources often provide improvements in energy efficiency as compared to gasoline powered internal combustion engines, they continue to require the use of heat transfer systems and heat transfer fluids. In particular, heat transfer systems and fluids are necessary to maintain optimum operating conditions, particularly in regards to temperature.

Unfortunately, however, traditional prior art cooling systems and heat transfer fluids are unsuitable (or not optimized) for use with alternative power sources, especially those employing electricity or an electrical charge. For example, traditional prior art heat transfer fluids are typically characterized by extremely high conductivities, often in the range of 3000 µS/cm or more. The use of highly conductive heat transfer fluids with alternative power sources, especially electricity based alternative power sources, can result in electrical shock, increased corrosion and/or the short-circuiting of electrical current.

As a result, conventional heat transfer fluids are unsuitable for use with alternative power sources, especially electricity based alternative power sources.

Fuel cells are a particularly attractive alternative power source because their clean and efficient operation. Fuel cells have been proposed for use in numerous applications.

For example, it has been proposed that fuel cells replace the internal combustion engines currently used in automobiles. Several different kinds of fuel cells are currently under development and appear to hold promise for use in automotive applications. Illustrative examples include Proton Exchange Membrane or Polymer Electrolyte Membrane (PEM) fuel cells, phosphoric acid (PA) fuel cells, molten carbonate (MC) fuel cells, solid oxide (SO) fuel cells, and alkaline fuel cells.

A fuel cell assembly typically comprises an anode, a cathode, and an electrolyte in between the two electrodes. Normally, an oxidation reaction (e.g., $H_2 \rightarrow 2H^+ + 2e$) takes place at the anode and a reduction reaction (e.g., $O_2 + 2H_2O + 4e \rightarrow 4OH^-$) takes place at the cathode. The electrochemical reactions that occur at the electrodes are exothermic, i.e., they produce heat.

The successful replacement of internal combustion engines with fuel cells requires that optimal operating conditions be achieved and maintained, i.e., a fuel cell must achieve the desirable current density level without degradation of fuel cell components. It is therefore necessary to control the exothermic heat produced during the electrochemical reactions.

For example, to achieve optimal operating conditions, the normal operating temperature of a PEM fuel cell assembly is controlled so that it remains within a range of from 60° C. to 95° C. Because of the exothermic nature of the electrochemical reactions, it is desirable to use a heat transfer fluid or heat transfer fluid to keep the electrode assembly at an operating temperature that is within the desired operating temperature range. However, the presence of an electrical charge makes it challenging to use fuel cells with prior art heat transfer systems and fluids.

For example, in order to produce sufficient power, a fuel cell based automotive engine might have many fuel cells connected together in series to form a fuel cell stack. Individual fuel cells may have an operating voltage of from 0.6 to 1.0V DC. In one instance, it is contemplated that anywhere from 100 to 600 individual fuel cells might be connected in series. As a result, the DC electrical voltage across automotive fuel cell stacks could be very high, typically ranging from 125 to 450 V DC.

These same voltages are experienced in the heat transfer fluid systems of the individual fuel cells used in automotive fuel cell stacks. To prevent or minimize electrical shock hazard, the heat transfer fluid must have very low conductivity. Low electrical conductivity for fuel cell heat transfer fluid is also desirable for the reduction of shunt current in the heat transfer fluid system and the minimization of system efficiency reduction.

There is therefore a need to provide 'low conductivity' heat transfer fluids intended for use in heat transfer systems that are in thermal communication with alternative power sources.

In addition to low electrical conductivity, heat transfer fluids used with alternative power sources must also have high heat capacity, low viscosity, and high thermal conductivity. Such properties help minimize pressure drops and reduce pumping power requirements while still meeting heat transfer requirements. Good surface wetting properties are also desirable in a heat transfer fluid employed with alternative power sources. A heat transfer fluid with good surface wetting characteristics is helpful in reducing pressure drops at a condition of constant flow rate.

Another important characteristic of a desirable heat transfer fluid is corrosion resistance. Many heat transfer fluid systems used with alternative power sources often have several metallic components. Illustrative metals found in heat transfer systems employed with alternative power sources include ferrous and non ferrous alloys such as stainless steel, aluminum, brass, braze alloy, and the like. However, such metals are vulnerable to corrosion as a result of contact with the heat transfer fluid.

There is therefore a need to provide colored heat transfer fluids in heat transfer systems used with alternative power sources that minimize corrosion and prolong the service life of the heat transfer system. More particularly, there remains a need for low conductivity heat transfer fluids that inhibit the corrosion of heat transfer systems in thermal communication with alternative power sources.

Finally, heat transfer fluids such as heat transfer fluids or antifreezes used in automotive engines are almost always colored by the addition of a dye to provide identity and prevent confusion between different heat transfer fluid technologies and with other functional fluids used in automobiles. Such coloring is also intended to provide information as to the concentration of the heat transfer fluid and to allow the heat transfer fluid to be recognizable during and after use in the cooling system.

However, dyes and colorants used in heat transfer fluids intended for use in internal combustion engines are typically highly conductive ionic species. Illustrative examples of such dyes and colorants are Direct Blue 199 (copper phthalocyanine, tetrasulfonic acid), Acid Green 25 (1,4-bis(4'-methyl-3'phenylsulfonato)amino anthraquinone), Acid Red 52 (sulforhodamine B) and uranine (sodium fluorescein). Such dyes cannot be used in fuel cell heat transfer fluids because of the requirement that fuel cell heat transfer fluids have very low conductivity.

Thus, there remains a need for heat transfer fluids that are colored but still possess very low conductivity and which are suitable for use with alternative power sources such as fuel cells.

SUMMARY OF THE INVENTION

Disclosed is a colored heat transfer fluid, the heat transfer fluid comprising a non-conductive colorant and having a conductivity of less than 200 µS/cm.

In addition, a method of coloring a heat transfer fluid for use in a fuel cell assembly is provided. The disclosed method comprises adding a non-conductive colorant to a heat transfer fluid to provide a colored heat transfer fluid having a conductivity of less than 10 µS/cm.

Also disclosed is a heat transfer system, comprising a circulation loop defining a flow path for a colored heat transfer fluid having a conductivity of less than 200 µS/cm and comprising the disclosed non-conductive colorant.

Finally, an assembly powered by an alternative power source is disclosed, the assembly comprising an alternative power source and a heat transfer system in thermal communication with the alternative power source, the heat transfer system comprising a circulation loop defining a liquid flow path, and the disclosed colored heat transfer fluid in thermal communication with the alternative power source, the colored heat transfer fluid having a conductivity of less than 200 µS/cm. In one exemplary embodiment, the alternative power source comprises a fuel cell comprising an electrode assembly comprising an anode, a cathode, and an electrolyte.

DETAILED DESCRIPTION OF A PREFERRED EMBODIMENT

Figure 1:
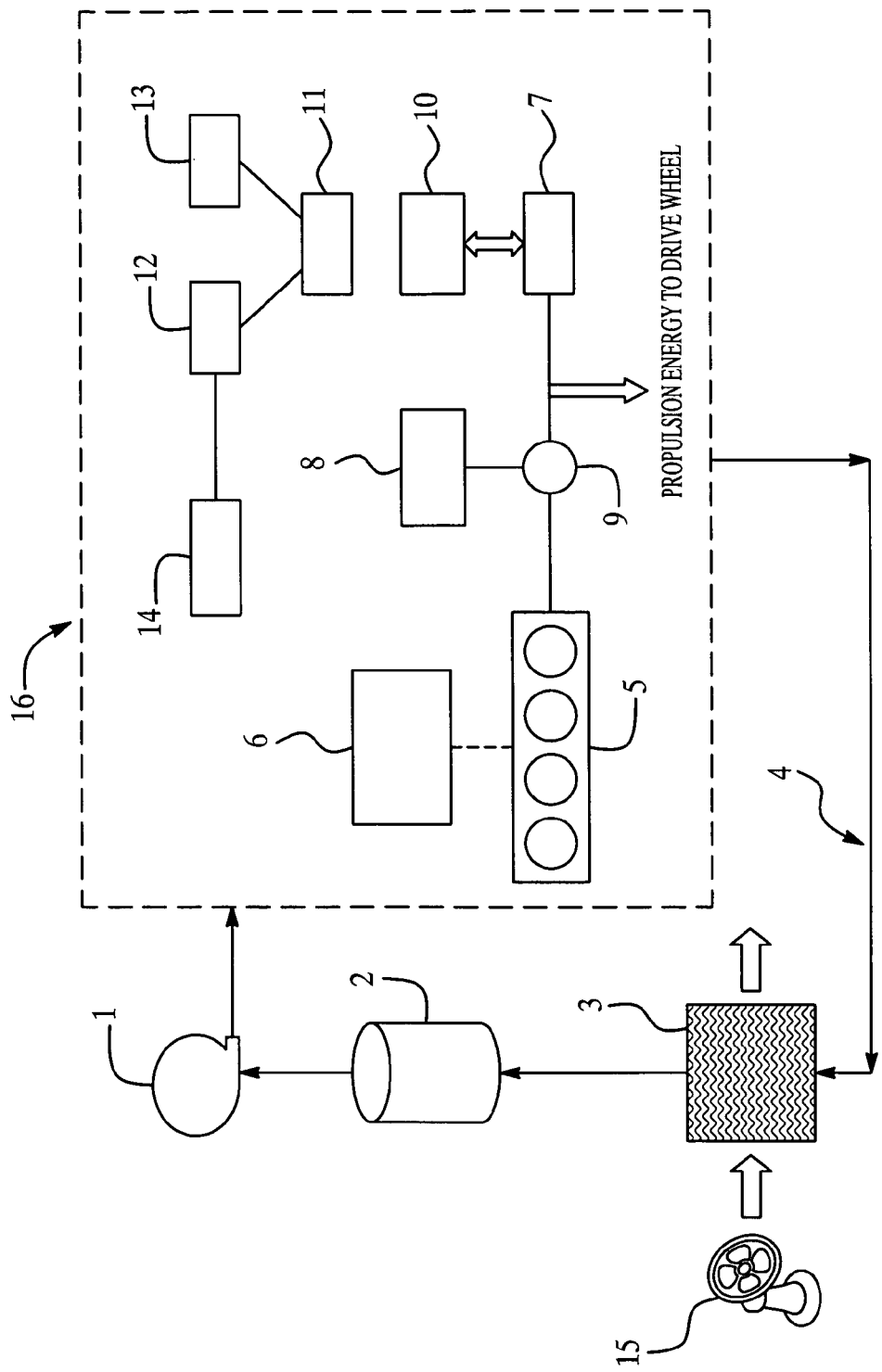
FIG. 1 is a schematic diagram of an illustrative assembly comprising an alternative power source and a heat transfer system, more particularly a hybrid vehicle cooling system.

The disclosed colored heat transfer fluids for use in assemblies comprising alternative power sources, especially fuel cells, may be characterized as having very low conductivity.

The term 'heat transfer fluid' as used herein refers to a fluid that is capable of transferring and/or dissipating a quantity of thermal energy from a first point to second point. In one embodiment, the disclosed heat transfer fluids may be referred to as coolants. In another embodiment, the disclosed heat transfer fluids may also be referred to as antifreeze, due to the ability of some heat transfer fluids to function as freezing point depressants.

The term 'low conductivity' as used herein generally refers to electrical conductivities of no more than 200 µS/cm. In one embodiment, the disclosed colored heat transfer fluids will have a conductivity of less than 150 µS/cm, while in another embodiment, the disclosed colored heat transfer fluids will have a conductivity of less than 50 µS/cm.

In other embodiments, the disclosed colored heat transfer fluids will have an electrical conductivity of from 0.02 µS/cm to no more than 200 µS/cm. In one embodiment, the disclosed colored heat transfer fluids for use in fuel cells will have a conductivity of from 0.2 µS/cm to 100 µS/cm. In another embodiment, the disclosed colored heat transfer fluids will have a conductivity of from 0.05 to less than 50 µS/cm, while in one exemplary embodiment, the disclosed colored heat transfer fluids will have a conductivity of from 0.05 to no more than 25 µS/cm. In an especially exemplary embodiment, the disclosed colored heat transfer fluids will have an electrical conductivity of from 0.05 to no more than 10 µS/cm. In one especially exemplary embodiment, the disclosed colored heat transfer fluids will have an electrical conductivity of from 0.05 to no more than 5 µS/cm.

The electrical conductivity of the disclosed colored heat transfer fluids may be measured by using the test methods described in ASTM D1125, i.e., "Standard Test Methods for Electrical Conductivity and Resistivity of Water" or an equivalent method.

The disclosed colored heat transfer fluids may also be corrosion inhibiting. The term 'corrosion inhibiting heat transfer fluid' refers to a heat transfer fluid having a sufficient amount of one or more corrosion inhibitors such that metallic components immersed in said fluid have a reduced rate of corrosion relative to their corrosion in a heat transfer fluid that is identical in all respects except that it lacks any corrosion inhibitors.

A 'colored heat transfer fluid' as used herein refers to a heat transfer fluid having a sufficient amount of one or more colorants such that the color of the heat transfer fluid may be measured by either the naked eye or by analytical techniques using selective absorption or scattering of visible light, i.e., light with wavelengths of approximately between 350 nm and 750 nm.

In one embodiment, the disclosed colored heat transfer fluids will comprise a non-conductive colorant. In another embodiment, the disclosed colored heat transfer fluids will comprise at least one alcohol in addition to the non-conductive colorant. In one exemplary embodiment, the disclosed colored heat transfer fluids will comprise a non-conductive colorant, at least one alcohol, and water. In another exemplary embodiment, the disclosed colored heat transfer fluids will comprise a nonconductive colorant, water, at least one alcohol, a corrosion inhibitor, and optionally one or more of an antifoam agent, a bittering agent, a wetting agent, a non-ionic dispersant, combinations thereof, and the like.

'Heat transfer fluid' as used herein refers to both concentrated solutions of the corrosion inhibitor and alcohol or water/alcohol mixtures as well as to diluted solutions of the same mixed with water, preferably deionized water. It will be appreciated that although heat transfer fluid may be purchased, transported or used in concentrated solutions consisting mainly of one or more alcohols and corrosion inhibitor, such concentrates will often be diluted with water, especially deionized water, prior to incorporation or use in a fuel cell. Dilution ratios of from 1:4 to 4:1 (DI water:Heat transfer fluid) are typical, with ratios of from 40%:60% to 60%:40% being used in one exemplary embodiment. Thus, the term 'heat transfer fluid' as used herein refers to both concentrated solutions and dilute solutions of the disclosed heat transfer fluids.

In one embodiment, the non-conductive colorants used in the disclosed colored heat transfer fluids are non-ionic or weakly ionic species that are soluble or dispersible in the at least one alcohol or a mixture of alcohols and water at the use concentration of the colorants required to provide coloring of the heat transfer fluid.

The term 'non-conductive' as used herein relates to a colorant that produces a conductivity increase of less than about 10 μS/cm when introduced into a standard solution of deionized water, at a maximum concentration of no more than 0.2% by weight, based on the total weight of the standard solution. In one exemplary embodiment, suitable non-conductive colorants will possess good stability in a mixture of alcohol and water under fuel cell operating conditions, i.e., typically temperatures of from about 40° C. to about 100° C.

In one embodiment, the non-conductive colorant is substantially free of functional groups that will form an ionic species due to hydrolysis in an aqueous alcohol or glycol solution. "Substantially free" as used herein refers to an amount that is not in excess of an amount that will lead to the conductivity of the colored heat transfer fluid being higher than 10 μS/cm. In another embodiment, the non-conductive colorant is substantially free of functional groups selected from the group consisting of carboxylate groups, sulfonate groups, phosphonate groups, quaternary ammonium cation groups, groups that carry a positive charge, and groups that carry a negative charge. Illustrative examples of groups that carry a positive charge include $Na^+$, $Cu^{2+}$, $N^+R_3$ wherein R may independently be H, $C_1$ to $C_{20}$ alkyl or aromatic ring containing groups, $Fe^{3+}$, combinations thereof, and the like. Illustrative examples of groups that carry a negative charge include $Cl^-$, $Br^-$, $I^-$, combinations thereof, and the like.

In one embodiment, the non-conductive colorant will comprise at least one of the following chromophores: anthraquinone, triphenylmethane, diphenylmethane, triarylmethane, diarylmethane, azo containing compounds, disazo containing compounds, trisazo containing compounds, diazo containing compounds, xanthene, acridine, indene, thiazole, two or more conjugated aromatic groups, two or more conjugated heterocyclic groups (e.g. stilbene, and/or pyrazoline, and/or coumarine type radicals or mixture there of), three or more conjugated carbon-carbon double bonds (e.g., carotene), and combinations thereof. In one exemplary embodiment, the chromophore will include one of the following or their combination: triphenylmethane, diphenylmethane, triarylmethane, diarylmethane, and azo containing radical.

In another embodiment, the non-conductive colorant will contain alkyleneoxy or alkoxy groups and at least one chromophore such as described above. In one embodiment, the chromophore contained in the colorants will be selected from the group consisting of anthraquinone, triphenylmethane, diphenylmethane, triarylmethane, diarylmethane, azo containing compounds, disazo containing compounds, trisazo containing compounds, diazo containing compounds, two or more conjugated aromatic groups, two or more conjugated heterocyclic groups, and combinations thereof.

Alternatively, suitable non-conductive colorants may be described as those colorants of the formula:

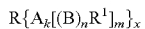

wherein R is an organic chromophore selected from the group consisting of anthraquinone, triphenylmethane, diphenylmethane, triarylmethane, diarylmethane, azo containing compounds, disazo containing compounds, trisazo containing compounds, diazo containing compounds, xanthene, acridine, indene, thiazole, two or more conjugated aromatic groups, two or more conjugated heterocyclic groups, and combinations thereof; A is a linking moiety in said chromophore and is selected from the group consisting of O, N and S; k is 0 or 1; B is selected from the group consisting of one or more alkyleneoxy or alkoxy groups containing from 1 to 8 carbon atoms; n is an integer of from 1 to 100; m is 1 or 2; x is an integer of from 1 to 5; and $R^1$ is selected from the group consisting of H, $C_1$-$C_6$ alkyl groups or alkoxy groups containing from 1 to 8 carbon atoms, and combinations thereof.

In one exemplary embodiment, suitable non-conductive colorants are those colorants of the above formula wherein A is N or O; B is selected from the group of one or more alkyleneoxy constituents containing from 2 to 4 carbon atoms, n is from 1 to 30, m is 1 or 2, X is preferably 1 or 2, and $R^1$ is preferably H or a $C_1$-$C_4$ alkyl groups or alkoxy groups containing from 1 to 6 carbon atoms.

In one exemplary embodiment, the non-conductive colorants may be prepared by various known methods such as are described in U.S. Pat. No. 4,284,729, U.S. Pat. No. 6,528,564 B1 or other patents issued to Milliken & Company, Spartanburg, S.C., USA. For example, suitable colorants may be prepared by converting a dyestuff intermediate containing a primary amino group into the corresponding polymeric compound and employing the resulting compound to produce a compound having a chromophoric group in the molecule. In the case of azo dyestuffs, this may be accomplished by reacting a primary aromatic amine with an appropriate amount of an alkylene oxide or mixtures of alkylene oxides, such as ethylene oxide and the like, according to known procedures, and then coupling the resulting compound with a diazonium salt of an aromatic amine. In order to prepare liquid colorants of the triarylmethane class, aromatic amines that have been reacted as stated above with an alkylene oxide are condensed with aromatic aldehydes and the resulting condensation products oxidized to form the triarylmethane liquid colorants. Other suitable colorants may also be prepared by these and other known procedures.

In one embodiment, colorants containing ionic species can be used if purification methods are employed. Illustrative purification and chemical separation techniques include, treatment with ion exchange resins, reversed osmosis, extraction, absorption, distillation, filtration, etc. and similar processes used to remove the ionic species in order to obtain a purified colorant that is electrically non-conductive and suitable for use herein.

In one embodiment, commercially available examples of suitable non-conductive colorants for use in the disclosed colored heat transfer fluids and method include Liquitint® Red or other similar polymeric colorants from Milliken Chemical of Spartanburg, S.C., USA, or colorants from Chromatech of Canton, Mich., USA. Other illustrative colorants include the following: Liquitint Red ST, Liquitint Blue RE, Liquitint Red XC, Liquitint Patent Blue, Liquitint Bright yellow, Liquitint Bright orange, Liquitint Royal Blue, Liquitint Blue N-6, Liquitint Bright Blue, Liquitint Supra Blue, Liquitint Blue HP, Liquitint Blue DB, Liquitint Blue II, Liquitint Exp. Yellow 8614-6, Liquitint Yellow BL, Liquitint Yellow II, Liquitint Sunbeam Yellow, Liquitint Supra yellow, Liquitint Green HMC, Liquitint violet, Liquitint Red BL, Liquitint Red RL, Liquitint Cherry Red, Liquitint Red II, Liquitint Teal, Liquitint Yellow LP, Liquitint Violet LS, Liquitint Crimson, Liquitint Aquamarine, Liquitint Green HMC, Liquitint Red HN, Liquitint Red ST, as well as combinations thereof.

In one exemplary embodiment, the non-conductive colorant will be at least one of Liquitint® Red ST and Liquitint® Patent Blue from Milliken, Liquitint® Red XC from Chromatech, Liquitint® Red from Milliken, Chromatint® Yellow 1382 from Chromatech or Liquitint® Blue® RE from Chromatech, while in an especially exemplary embodiment, the non-conductive colorant will be Liquitint® Blue RE from Chromatech or Liquitint® Patent Blue from Milliken.

In one embodiment, the non-conductive colorant will be present in the colored heat transfer fluid in an amount of from 0.0001 to 0.2% by weight, based on the total amount of the colored heat transfer fluid. In another embodiment, the non-conductive colorant will be present in the heat transfer fluid in an amount of from 0.0002-0.1% by weight, based on the total amount of the heat transfer fluid, while in one exemplary embodiment; the non-conductive colorant will be used in an amount of from 0.0002 to 0.05% by weight, based on the total amount of the colored heat transfer fluid.

Illustrative examples of suitable alcohols for use in the disclosed heat transfer fluids are methanol, ethanol, propanol, butanol, furfurol, ethylene glycol, diethylene glycol, triethylene glycol, 1,2-propylene glycol, 1,3-propylene glycol, dipropylene glycol, butylene glycol, glycerol, monoethylether of glycerol, dimethyl ether of glycerol, 1,2,6-hexanetriol, trimethylolpropane, methoxyethanol, or a combination comprising one or more of such alcohols. Illustrative examples of particularly suitable alcohols include ethylene glycol, propylene glycol, butyl glycol, glycerol, diethylene glycol, and the like, as well as mixtures thereof. In one embodiment, the alcohol will be ethylene glycol or 1,2-propylene glycol or 1,3-propylene glycol, while in one exemplary embodiment; the disclosed colored heat transfer fluid will comprise ethylene glycol.

In one embodiment, the alcohol will be present in the heat transfer fluid in an amount of from 10-99.9% by weight, based on the total amount of the colored heat transfer fluid. In another embodiment, the at least one alcohol will be present in the heat transfer fluid in an amount of from 20-99.9% by weight, based on the total amount of the heat transfer fluid, while in one exemplary embodiment, the at least one alcohol will be used in an amount of from 20 to 99.9% by weight, based on the total amount of the colored heat transfer fluid.

As previously indicated, water may be present in the disclosed colored fuel cell heat transfer fluids. In one exemplary embodiment, deionized water will be used. In one embodiment, water will be present in the colored heat transfer fluid in an amount of from 0-90% by weight, based on the total amount of the heat transfer fluid. In another embodiment, water will be present in the heat transfer fluid in an amount of from 0.1-80% by weight, based on the total amount of the heat transfer fluid, while in one exemplary embodiment; water will be used in an amount of from 0.1 to 70% by weight, based on the total amount of the colored heat transfer fluid.

For example, water may not be present in the concentrate version of a heat transfer fluid at all, i.e., 0 wt % but may be present in some concentrates in amounts up to about 50 wt % while in others up to about 20 wt %, based on the total weight of the concentrate. With regards to diluted heat transfer fluids, water may be present in amounts of from 20 wt % up to 90% wt, based on total weight.

Suitable corrosion inhibitors include aluminum and aluminum based alloy corrosion inhibitors, copper and copper based corrosion inhibitors, ferrous metal corrosion inhibitors, such as azole derivatives, and amines such as ethanolamine, diethanolamine, triethanolamine, octylamine and morpholine, orthosilicate esters as described in US2004/0028971A1 and the like.

In one exemplary embodiment, the corrosion inhibitor will comprise a corrosion inhibitor comprising an azole compound and at least one of a siloxane based surfactant, silica, or combinations thereof.

Suitable azole compounds are five-membered heterocyclic compounds having 1 to 4 nitrogen atoms. Illustrative examples include imidazoles, triazoles, thiazoles and tetrazoles of the formulas (I), (II), (III) and (IV) below, such as benzotriazole, tolytriazole, alkyl benzotriazoles, such as 4-methyl benzotriazole, 5-methyl benzotriazole, and butyl benzotriazole and the like, benzimidazole, halobenzotriazoles, such as chloro-methylbenzotriazole, tetrazole, substituted tetrazoles, thiazoles, such as 2-mercaptobenzothiazole, and the like.

In one embodiment, the azole compound will be of the formula (I), (II) (III) or (IV):

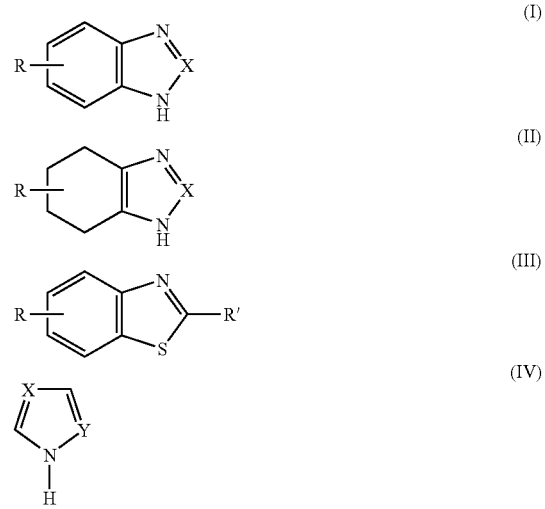

wherein R is hydrogen or halogen such as Cl or Br, or a $C_1$ to $C_{20}$ alkyl group; R' is at least one of hydrogen, $C_1$ to $C_{20}$ alkyl group, or SH or SR group; and X is N, C—SH or CH; and Y is selected from N, C—R or CH group, and R is defined as above. In one exemplary embodiment, the azole compound will be of formula (I) wherein X is N. In one particularly exemplary embodiment, the azole compound will be of formula (I) wherein X is N and R is hydrogen or an alkyl group of from 1 to less than 10 carbons.

As used herein, the term "alkyl" includes both branched and straight chain saturated aliphatic hydrocarbon groups, having the specified number of carbon atoms. The term $C_1$-$C_7$ alkyl as used herein indicates an alkyl group having from 1 to about 7 carbon atoms. When $C_0$-$C_n$ alkyl is used herein in conjunction with another group, for example, heterocycloalkyl($C_0$-$C_2$ alkyl), the indicated group, in this case heterocycloalkyl, is either directly bound by a single covalent bond ($C_0$), or attached by an alkyl chain having the specified number of carbon atoms, in this case from 1 to about 2 carbon atoms. Examples of alkyl include, but are not limited to, methyl, ethyl, n-propyl, isopropyl, n-butyl, 3-methylbutyl, t-butyl, n-pentyl, and sec-pentyl Illustrative examples of suitable azole compounds include benzotriazole, tolytriazole, methyl benzotriazole, i.e., 4-methyl benzotriazole and 5-methyl benzotriazole, butyl benzotriazole, mercaptobenzothiazole, benzimidazole, halo-benzotriazoles, such as chloro-methylbenzotriazoles, and the like. In one embodiment, the azole compound will be one of benzotriazole, tolytriazole, or mercaptobenzothiazole, while in one exemplary embodiment; the azole compound will be benzotriazole.

In one embodiment, the azole compound may be present in the corrosion inhibiting heat transfer fluid in an amount of from 1 ppm to about 5000 ppm, while in one exemplary embodiment; the azole compound will be present in an amount of from 10 ppm to about 500 ppm, based on the total weight of the heat transfer fluid.

In addition to the azole compound, the disclosed corrosion inhibitor for low conductivity heat transfer fluids requires at least one of a siloxane based surfactant, colloidal silica or a mixture thereof.

Siloxane based surfactants as used herein generally refers to polysiloxanes and organosilane compounds comprising at least one silicon-carbon bond.

In one embodiment, suitable polysiloxanes are generally those polysiloxanes believed to be of the general formula $R''_3$—Si—[O—Si($R''$)$_2$], —OSi$R''_3$ wherein $R''$ is an alkyl group or polyalkylene oxide copolymer of from 1 to 200 carbons and x can be from 0 to 100. In one exemplary embodiment, suitable polysiloxanes will have at least one $R''$ group that is a hydrophilic group such as a polyalkylene oxide copolymer of one or more alkylene oxides having from 2 to 6 carbons, especially from 2 to 4 carbons.

It will be appreciated by those of skill in the art that commercially available polysiloxanes for which the structure is unknown or which is outside the scope of this formula may also be suitable for use in the disclosed corrosion inhibitor and fuel cell heat transfer fluid.

For example, in one embodiment, suitable polysiloxanes may be defined by similarities to suitable commercially available polysiloxanes such as the Silwet® siloxane surfactants from GE Silicones/OSi Specialities, and other similar siloxane-polyether copolymers available from Dow Corning or other suppliers. In one exemplary embodiment, suitable siloxane based surfactants will be exemplified by Silwet® L-77, Silwet® L-7657, Silwet® L-7650, Silwet® L-7600, Silwet® L-7200, Silwet® L-7210 and the like.

Suitable organosilane compounds are those silane compounds comprising at least one silicon-carbon bond capable of hydrolyzing in the presence of water to form a silanol, i.e., a compound with one or more Si—OH groups. In one embodiment, suitable organosilane compounds are those of the general formula ZSi(OZ)$_3$ wherein the Z groups may be aromatic groups, cycloaliphatic groups, alkyl groups, alkoxy groups, or alkylene groups, and may contain heteroatoms such as N, S, or the like in the form of functional groups such as amino groups, epoxy groups, and the like. In one embodiment, suitable organosilane compounds are of the general formula Z'Si(OZ)$_3$ wherein Z' may be at least one of aromatic groups, cycloaliphatic groups, alkyl groups, alkoxy groups, or alkylene groups, and may contain hetero atoms such as N, S, or the like in the form of functional groups such as amino groups, epoxy groups, and the like, while Z is an alkyl group of from 1 to 5 carbons.

It will again be appreciated by those of skill in the art that commercially available organosilanes for which the structure is unknown or which is outside the scope of this formula may also be suitable for use in the disclosed corrosion inhibitor and fuel cell heat transfer fluid.

For example, in one embodiment, suitable organosilanes may be defined by similarities to suitable commercially available organosilanes such as the Silquest® or Formasil® surfactants from GE Silicones/OSi Specialities, and other suppliers. In one exemplary embodiment, suitable siloxane based surfactants will be exemplified by Formasil 891, Formasil 593, formasil 433, Silquest Y-5560 silane (i.e., polyalkyleneoxidealkoxysilane), Silquest A-186 (2-(3,4-epoxycyclohexyl)ethyltrimethoxysilane), Silquest A-187 (3-glycidoxypropyltrimethoxysilane), or other Silquest silanes available from GE Silicones, Osi Specialties or other suppliers and the like.

Other suitable organosilanes which are believed to be commercially available and are illustrative of suitable siloxane based surfactants include 3-aminopropyltriethoxysilane, N-2-(aminoethyl)-3-aminopropyltrimethoxysilane, octyltriethoxysilane, vinyltriethoxysilane, vinyltrimethoxysilane, methyltriethoxysilane, 3-methacryloxypropyltrimethoxysilane, 3-mercaptopropyltrimethoxysilane, isobutyltrimethoxysilane, phenyltrimethoxysilane, methyltrimethoxysilane, and other such siloxane based surfactants having similar structures but varying numbers of carbons.

In one embodiment, the siloxane based surfactant may be present in the corrosion inhibiting heat transfer fluid in an amount of from 0.01 wt % to about 10 wt %, based on the total weight of the heat transfer fluid, while in one exemplary embodiment; the siloxane based surfactant will be present in the corrosion inhibiting heat transfer fluid in an amount of from 0.02 wt % to about 2 wt %, based on the total weight of the heat transfer fluid.

In addition to or in place of the siloxane based surfactant, the corrosion inhibiting heat transfer fluid may also comprise silica. The terms 'silica' or 'colloidal silica' are used interchangeably and refers to either colloidal silica, silica in nanoform or a combination thereof. While not wishing to be bound to a particular theory, it is believed that the use of silica of a particular average particle size provides improvements in heat transfer efficiency and/or the heat capacity of a fuel cell heat transfer fluid.

In one embodiment, suitable colloidal silica will have a nominal particle size of from about 1 nm to about 200 nm. In one exemplary embodiment suitable colloidal silica will have an average particle size of from about 1 nm to about 100 nm while in one especially exemplary embodiment, suitable colloidal silica will have an average particle size of from 1 nm to about 40 nm.

Suitable colloidal silica having the appropriate particle size is commercially available under the Ludox® brand from DuPont or Grace Davidson, under the Nyacol® or Bindzil® brands from Akzo Nobel or Eka Chemicals, under the Snowtex® brand from Nissan Chemical. Other suppliers of suitable silica include Nalco and the like.

In one embodiment, the colloidal silica will be used in the corrosion inhibiting heat transfer fluid in an amount of no more than 10,000 ppm, while in one exemplary embodiment; the colloidal silica will be used in an amount of less than 2000 ppm.

It will also be appreciated that the corrosion inhibitor of the corrosion inhibiting heat transfer fluid may also comprise a combination of the siloxane based surfactant and colloidal silica.

In one embodiment, one or more corrosion inhibitors will be present in the heat transfer fluid in an amount of from 0.0 to 10.0% by weight, based on the total amount of the colored heat transfer fluid. In another embodiment, one or more corrosion inhibitors will be present in the heat transfer fluid in an amount of from 0.0-5% by weight, based on the total amount of the heat transfer fluid, while in one exemplary embodiment, one or more corrosion inhibitors will be used in an amount of from 0.0 to 2% by weight, based on the total amount of the colored heat transfer fluid.

The disclosed colored heat transfer fluids may also comprise one or more additional additives such as defoamers, surfactants, scale inhibitors, dispersants, wetting agents, bittering agents, and the like, in amounts of up to 10% by weight, based on the total amount of the colored heat transfer fluid.

In one embodiment, the disclosed colored heat transfer fluids will comprise from 20-99.9% by weight of at least one alcohol or an alcohol mixture, from 0.1-80% by weight of water, and from 0.0001 to 0.1% by weight of a non-conductive colorant, based on the total amount of the heat transfer fluid, and 0.0 to 10% by weight of other optional heat transfer fluid additives. In one exemplary embodiment, the disclosed heat transfer fluids will comprise from 20-99.9% by weight of at least one alcohol or an alcohol mixture, from 0.1-80% by we of water, and from 0.0001 to 0.1% by weight of a non-conductive colorant, and 0.0 to 10% by weight of other heat transfer fluid additives based on the total amount of the heat transfer fluid.

In another exemplary embodiment, the disclosed heat transfer fluids will comprise from 20-99.9% by weight of at least one alcohol, from 0.1-80% by weight of water, from 0 to 5% by weight of one or more corrosion inhibitors, and from 0.0001 to 0.1% by weight of a non-conductive colorant and an optional antifoam agent in an amount of from 0.0 to 0.1% by weight, based on the total amount of the heat transfer fluid.

The disclosed colored heat transfer fluids may be prepared by mixing the components together. Normally, the alcohol and water are preferably mixed together first. The other additives are then added to the alcohol-water mixture by mixing and adequate stirring.

It will be appreciated that the disclosed heat transfer fluids may be used in a variety of assemblies comprising one or more alternative power sources. The term 'alternative power source' as used here refers to power source technologies that provide improvements in energy efficiency, environmental concerns, waste production and management issues, natural resource management, and the like. Examples of alternative power sources that have been developed include, but are not limited to, batteries, fuel cells, solar cells or solar panels, photovoltaic cells, and internal combustion engines powered by the condensation of steam, natural gas, diesel, hydrogen, and/or the like. In one embodiment, the term 'alternative power source' includes devices powered by internal combustion engines operating with a clean heat transfer system, i.e., a heat transfer system that does not contribute to the concentration of ionic species in the heat transfer fluid. Such alternative power sources may be used alone or in combinations thereof, such as those employed in hybrid vehicles.

It will be appreciated that assemblies comprising such alternative power sources include any article traditionally powered by an internal combustion engine, such as automotive vehicles, boats, generators, lights, aircrafts and airplanes, trains or locomotives, military transport vehicles, stationary engines, and the like. The assemblies also include additional systems or devices required for the proper utilization of alternative power sources, such as electric motors, DC/DC converters, DC/AC inverters, electric generators, and other power electronic devices, and the like. The assemblies may also include systems or devices required for the proper utilization of the alternative power sources such as electric motors, DC/CC converters, DC/AC inverters, electric generators, and other power electronics and electrical devices, and the like.

Particularly suitable applications are those having heat transfer systems that require heat transfer fluids having low conductivity. Illustrative examples include glass and metal manufacturing processes where a high electrical voltage/current is applied to the electrodes used to keep a material such as glass or steel in a molten state. Such processes typically require a heat transfer fluid having low conductivity to cool the electrodes.

The disclosed assemblies will generally comprise an alternative power source and a heat transfer system in thermal communication with the alternative power source. In one embodiment, the heat transfer system will comprise a circulation loop defining a flow path for a colored heat transfer fluid having a conductivity of less than 200 μS/cm. In one exemplary embodiment, the heat transfer system will comprise a circulation loop defining a flow path for a colored heat transfer fluid having a conductivity of less than 200 μS/cm and comprising the disclosed nonconductive colorants.

An illustrative example of the disclosed assembly may be seen in FIG. 1. The major components of the cooling system, and the main system components 16 that may require the use of coolant or heat transfer fluid as cooling media are shown in the FIGURE. As indicated therein, the assembly may contain internal combustion engine 5, or fuel cells 5 or solar cells 5 as the vehicle primary power source 7. It also contains a rechargeable secondary battery 12 or an optional ultra-capacitor 13 that may be charged via the vehicle regenerative braking system. In this embodiment, the battery 12 and/or the ultra-capacitor 13 may act as secondary power sources. The assembly may also contain power electronic devices, such as DC/DC converters 10, DC/AC inverters 10, generators 8, power splitting devices 9, and/or voltage boost converters 11, etc. In addition, the assembly may also contain fuel cell or solar cell "balance of plant" subsystems 6. These may be air compressors, pumps, power regulators, etc. The assembly also contain HAVC systems 14, e.g., air-conditioning system for the climate control of vehicle interior space. These are included in the vehicle system 16 in the illustrated assembly of FIG. 1 that may require the use of coolant or heat transfer fluid for temperature control. Similar to other vehicle cooling systems, the assembly in the illustrate example also contain a coolant recirculation pump 1, coolant flow path 4, coolant tank 2, and a radiator or heat exchanger 3, and a fan 15. The fan may be substituted by an external cooling source, e.g., a different (or isolated) cooling system with its own cooling media.

In one embodiment, the alternative power source will be a fuel cell. It will be appreciated that a fuel cell is in thermal communication with the disclosed heat transfer systems and fluids, the electrical conductivity of the disclosed heat transfer fluids will be, in one embodiment, no more than 10 μS/cm. In an especially exemplary embodiment comprising a fuel cell, the disclosed heat transfer fluids will have an electrical conductivity of from 0.02 to no more than 10 μS/cm. In one especially exemplary embodiment, the disclosed colored heat transfer fluids will have an electrical conductivity of from 0.05 to no more than 5 μS/cm.

The disclosed corrosion inhibiting heat transfer fluids may be used in a number of different types of fuel cells comprising an electrode assembly comprising an anode, a cathode, and an electrolyte, and a heat transfer fluid in thermal communication with the electrode assembly or fuel cell. In one embodiment the heat transfer fluid may be contained or flow in channel or flow path defined by a circulation loop or heat transfer fluid flow channel in thermal communication with said fuel cell.

Illustrative types of suitable fuel cells include PEM (Proton Exchange Membrane or Polymer Electrolyte Membrane) fuel cells, AFC (alkaline fuel cell), PAFC (phosphoric acid fuel cell), MCFC (molten carbonate fuel cell), SOFC (solid oxide fuel cell), and the like. In one exemplary embodiment, the disclosed corrosion inhibiting heat transfer fluids will be used in PEM and AFC fuel cells.

The singular forms "a", "an" and "the" include plural referents unless the context clearly dictates otherwise. "Optional" or "optionally" means that the subsequently described event or circumstance may or may not occur, and that the description includes instances where the event occurs and instances where it does not. The modifier "about" used in connection with a quantity is inclusive of the stated value and has the meaning dictated by the context (e.g., includes the degree of error associated with measurement of the particular quantity).

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from essential scope thereof. Therefore, it is intended that the invention not be limited to the particular embodiment disclosed as the best mode contemplated for carrying out this invention, but that the invention will include all embodiments falling within the scope of the appended claims.

Example 1

The conductivity as a function of colorant concentration in de-ionized water at room temperature was evaluated per Table 1a. Solutions of the various colorants identified below were mixed in de-ionized water at room temperature under simple agitation. Conductivity was measured via a Traceble® bench conductivity meter manufactured by Control Company, Friendswood, Tx., USA.

TABLE 1a

| Colorant Name | Concentration of Colorant in Solution (mg/L) | Conductivity of Solution (µS/cm) |
| --- | --- | --- |
| Uranine ®[1] | Blank | 0.30 |
|  | 20 | 3.36 |
|  | 50 | 8.27 |
|  | 100 | 16.67 |
| Liquitint ® Red ST | Blank | 0.27 |
|  | 20 | 0.45 |
|  | 50 | 0.58 |
|  | 100 | 0.65 |
| Liquitint ® Bright Yellow | Blank | 0.28 |
|  | 20 | 1.97 |
|  | 50 | 4.35 |
|  | 100 | 8.36 |
| Liquitint ® Patent Blue | Blank | 0.30 |
|  | 20 | 1.79 |
|  | 50 | 3.95 |
|  | 100 | 7.41 |
| Liquitint ® Bright Orange | Blank | 0.28 |
|  | 20 | 1.11 |
|  | 50 | 2.23 |
|  | 100 | 4.05 |
| Acid Red 52 | Blank | 0.25 |
|  | 20 | 5.98 |
|  | 50 | 13.41 |
|  | 100 | 33.9 |

[1]Commercially available from Honeywell-CPG of Danbury, CT.

It can be seen that the two commonly used antifreeze dyes, i.e., Uranine® dye and Acid Red 52 possess higher conductivity than the evaluated Liquitint® dyes at equivalent concentrations.

The conductivity of a series of 50 ppm colorant in a 50% wt ethylene glycol+50% DI water solution at room temperature was also evaluated per Table 1b.

TABLE 1b

| Colorant | Concentration (mg/L) | Conductivity (µS/cm) |
| --- | --- | --- |
| Chromatint Yellow 1382 | 50 | 0.91 |
| L85000 Liquitint ® Patent Blue | 50 | 1.61 |
| Liquitint ® Blue RE | 50 | 0.53 |
| Liquitint ® Red XC | 50 | 0.45 |
| Acid Red 52 | 50 | 6.3 |
| Blank Solution | 0 | 0.43 |

One can see that one commonly used antifreeze dye, Acid Red 52 has a much higher conductivity than the evaluated Liquitint and Chromatint Dyes at the same concentration.

Example 2

The Liquitint® Red dye was also found to be stable at 80° C. in 50% Ethylene glycol+50% de-ionized water (all as volume %). A test was done by dissolving 20 ppm Liquitint® Red into 50% ethylene glycol+50% de-ionized water solution (V/V). The solution was separated into two parts in two clean beakers. One was heated at 80° C. for about 45 minutes. The conductivity of the two solutions before and after the heating was recorded. There was no noticeable change in the solutions. The conductivity of the solution showed essentially no change before and after heating (Blank and before heating at 80° C.: 0.45 µS/cm; kept at 80° C. for ~45 min and cooled down to room temperature: 0.48 µS/cm).

Example 3

The effect of the non-conductive colorants and dyes upon the corrosion of metals in a fuel cell cooling system was evaluated.

Metal samples according to the following were cleaned with cleaner and de-ionized water before separating into two identical sets and put in 2 clean glass flasks. Each flask contained 4 cast Al coupons, 4 brass coupons, 4 stainless steel (SS316) coupons, 2 brazed Al coupon, 2 silicone gasket, 4 Viton O-rings. The total surface area was about 392 square centimeters. 300 ml 50% ethylene glycol+50% (volume) DI water was added into one flask while 300 ml 50% ethylene glycol+50% (volume) DI water+20 ppm Liquitint® Red ST was added to the second flask.

The conductivity of each solution was recorded as a function of time. Since corrosion of the metals will generate ionic species and increase the solution conductivity, the conductivity of the solution was used to indicate the extent of the corrosion of the metal samples in the flasks. The results obtained are listed below in Table 2.

TABLE 2

| Time | Conductivity of the Solution with 20 ppm Liquitint ® Red ST (µS/cm) | Conductivity of the Solution without the Dye (µS/cm) |
|---|---|---|
| 0 min | 0.50 | 0.49 |
| 20 min | 0.50 | 0.50 |
| 40 min | 0.51 | 0.49 |
| 100 min | 0.54 | 0.52 |
| 16 hours | 0.83 | 0.71 |

Little difference in conductivity was observed, indicating that 20 ppm Liquitint® Red ST has no effect on metal corrosion under the test conditions. Thus, Liquitint® Red ST dye added to a glycol/water mixture in an amount of 20 ppm did not enhance the corrosion of metals likely to be present in fuel cell cooling systems.

Example

An analysis was conducted to determine the most preferred chromophores for use in the disclosed heat transfer fluids. The results in the table below show that triarylmethane and triphenylmethane provide desirable results.

Test results provided in the foregoing examples show that Liquitint Blue RE, L83002 Liquitint Red XC, M91045 Chromatint Yellow 1382, all from Chromatech Inc. of Canton, Mich., and Liquitint Red ST from Milliken can be used as dyes for heat transfer fluids used in fuel cells, since they are essentially non-conductive polymeric colorants. Using FTIR, GC-MS, the chromophore types in the colorants were determined as follows: Liquitint Blue RE—triarymethane; Liquitint Red ST—benzothiazole; Liquitint Patent Blue—triarylemethane, probably triphenylmethane; Liquitint Red XC—possibly benzothiazole; Liquitint Bright Yellow—probably aniline methine; Liquitint Brilliant Orange—mixture, possibly includes a triarylmethane; Chromatint Yellow 1382—mixture, possibly triarylmethane.

| Colorant ID | Colorant Chromophore | FT-IR Results | GC-MS Results |
|---|---|---|---|
| Liquitint Blue RE | triarymethane | Similar to triarylmethane dyes | No volatiles detected |
| Liquitint Red ST | benzothiazole | Spectrum analysis suggests amine | 4-methyl-2-benzothiazole and 6-methyl-2-benzothiazole |
| Liquitint Patent Blue | triarylemethane, probably triphenylmethane | No match to azo or other dye types, IR spectrum matches Liquitint Blue RE | Various ethylene oxide compounds no amine detected |
| Liquitint Red XC | possibly benzothiazole | Inconclusive-probable amine present | 4-methyl-2-benzothiazolamine and diethylene glycol detected |
| Liquitint Bright Yellow | probably aniline methine | Inconclusive-probable amine present | Aniline (benzenamine) and 1,4-benzenediamine detected |
| Liquitint Brilliant Orange | mixture, possibly includes a triarylmethane | Inconclusive no match for azo, disazo, tartrazine, diarylide, anthraquinone, oxazine or sulfur type | 4-methyl-2-benzothiazolamine and diethylene glycol detected |
| Chromatint Yellow 1382 | mixture, possibly triarylmethane | Inconclusive - diethylene glycol masks information about chromophore | Diethylene glycol, various ethylene oxide compounds |

The invention claimed is:

1. A colored heat transfer fluid, the heat transfer fluid comprising 0.1 to 90% by weight water, based on the total amount of the heat transfer fluid, an alcohol, and a non-conductive colorant and having a conductivity of no more than or equal to 200 µS/cm, wherein the non-conductive colorant is of the formula:

$R\{Ak[(B)nR^1]m\}x$ wherein R is an organic chromophore selected from the group consisting of anthraquinone, triphenylmethane, diphenylmethane, azo containing compounds, disazo containing compounds, trisazo containing compounds, diazo containing compounds, xanthene, acridine, thiazole, two or more conjugated aromatic groups, two or more conjugated heterocyclic groups, and combinations thereof; A is a linking moiety in said chromophore and is selected from the group consisting of O, N and S; B is selected from the group consisting of one or more alkyleneoxy or alkoxy groups containing from 1 to 8 carbon atoms; k is 0 or 1; n is an integer of from 1 to 100; m is 1 or 2; x is an integer of from 1 to 5; and $R^1$ is H, a $C_1$-$C_6$ alkyl groups, an alkoxy group containing from 1 to 8 carbon atoms, or a combination thereof.

2. The colored heat transfer fluid of claim 1 having a conductivity of less than 10 µS/cm.

3. The colored heat transfer fluid of claim 2 having a conductivity from 0.02 to 5 µS/cm.

4. The colored heat transfer fluid of claim 1 wherein the non-conductive colorant is present in an amount of from 0.0001 to 0.2% by weight, based on the total weight of the colored heat transfer fluid.

5. The colored heat transfer fluid of claim 1 wherein the alcohol comprises at least one of methanol, ethanol, propanol, butanol, furfurol, ethylene glycol, diethylene glycol, triethylene glycol, 1,2-propylene glycol, 1,3-propylene glycol, dipropylene glycol, butylene glycol, glycerol, monoethylether of glycerol, dimethyl ether of glycerol, 1,2,6-hexanetriol, trimethylolpropane, methoxyethanol, or a combination thereof.

6. The colored heat transfer fluid of claim 1 further comprising at least one additive selected from defoamers, bitterants, dispersants, and combinations thereof.

7. A heat transfer system, comprising
a circulation loop defining a flow path for a colored liquid heat transfer fluid having a conductivity of less than 200 µS/cm;
wherein the colored liquid heat transfer fluid comprises 0.1 to 90% by weight water, based on the total amount of the heat transfer fluid, an alcohol, and a non-conductive colorant of the formula:

$R\{Ak[(B)nR^1]m\}x$ wherein R is an organic chromophore selected from the group consisting of anthraquinone, triphenylmethane, diphenylmethane, azo containing compounds, disazo containing compounds, trisazo containing compounds, diazo containing compounds, xanthene, acridine, thiazole, two or more conjugated aromatic groups, two or more conjugated heterocyclic groups, and combinations thereof; A is a linking moiety in said chromophore and is selected from the group consisting of O, N and S; B is selected from the group consisting of one or more alkyleneoxy or alkoxy groups containing from 1 to 8 carbon atoms; k is 0 or 1; n is an integer of from 1 to 100; m is 1 or 2; x is an integer of from 1 to 5; and $R^1$ is H, a $C_1$-$C_6$ alkyl groups, an alkoxy group containing from 1 to 8 carbon atoms, or a combination thereof.

8. An assembly powered by an alternative power source comprising
an alternative power source and a heat transfer system in thermal communication with the alternative power source, the heat transfer system comprising
a circulation loop defining a liquid flow path, and
a corrosion inhibiting heat transfer fluid in thermal communication with the alternative power source, the colored heat transfer fluid having a conductivity of less than 200 μS/cm and comprising
0.1 to 90% by weight water, based on the total amount of the heat transfer fluid,
an alcohol, and
a nonconductive colorant of the formula:

$$R\{Ak[(B)nR^1]m\}x$$

wherein R is an organic chromophore selected from the group consisting of anthraquinone, triphenylmethane, diphenylmethane, azo containing compounds, disazo containing compounds, trisazo containing compounds, diazo containing compounds, xanthene, acridine, thiazole, two or more conjugated aromatic groups, two or more conjugated heterocyclic groups, and combinations thereof; A is a linking moiety in said chromophore and is selected from the group consisting of O, N and S; B is selected from the group consisting of one or more alkyleneoxy or alkoxy groups containing from 1 to 8 carbon atoms; k is 0 or 1; n is an integer of from 1 to 100; m is 1 or 2; x is an integer of from 1 to 5; and $R^1$ is H, a $C_1$-$C_6$ alkyl groups, an alkoxy group containing from 1 to 8 carbon atoms, or a combination thereof.

9. The assembly of claim 8 wherein the alternative power source comprises a fuel cell comprising
an electrode assembly comprising
an anode,
a cathode, and
an electrolyte.

10. A method of coloring a heat transfer fluid having low conductivity, comprising
adding a non-conductive colorant to a heat transfer fluid comprising 0.1 to 90% by weight water, based on the total amount of the heat transfer fluid, and an alcohol to provide a colored heat transfer fluid having a conductivity of no more than or equal to 200 μS/cm, wherein the non-conductive colorant is of the formula:

$$R\{Ak[(B)nR^1]m\}x$$

wherein R is an organic chromophore selected from the group consisting of anthraquinone, triphenylmethane, diphenylmethane, azo containing compounds, disazo containing compounds, trisazo containing compounds, diazo containing compounds, xanthene, acridine, thiazole, two or more conjugated aromatic groups, two or more conjugated heterocyclic groups, and combinations thereof; A is a linking moiety in said chromophore and is selected from the group consisting of O, N and S; B is selected from the group consisting of one or more alkyleneoxy or alkoxy groups containing from 1 to 8 carbon atoms; k is 0 or 1; n is an integer of from 1 to 100; m is 1 or 2; x is an integer of from 1 to 5; and $R^1$ is H, a $C_1$-$C_6$ alkyl groups, an alkoxy group containing from 1 to 8 carbon atoms, or a combination thereof.

11. The method of claim 10, wherein the colored heat transfer fluid has a conductivity of less than 10 μS/cm.

* * * * *